(12) United States Patent
Gehrig et al.

(10) Patent No.: US 7,997,298 B2
(45) Date of Patent: Aug. 16, 2011

(54) DEVICE FOR REGULATION OF A CONCENTRATION FOR A PRODUCT IN A LIQUID

(75) Inventors: Jean Gehrig, Viry (FR); Denis Gehrig, St. Julien En Genevois (FR)

(73) Assignee: Special Coating Laboratory International Archamps (FR)

( * ) Notice: Subject to any disclaimer, the term of this patent is extended or adjusted under 35 U.S.C. 154(b) by 635 days.

(21) Appl. No.: 12/075,182

(22) Filed: Mar. 10, 2008

(65) Prior Publication Data

US 2009/0020175 A1  Jan. 22, 2009

(30) Foreign Application Priority Data

Mar. 8, 2007  (EP) .................................... 07004835

(51) Int. Cl.
*G05D 9/02* (2006.01)

(52) U.S. Cl. ................ 137/453; 137/563; 222/588

(58) Field of Classification Search ............. 137/134, 137/142, 144, 147, 158, 159, 171, 389, 393, 137/565.17, 563, 453, 588; 222/588
See application file for complete search history.

(56) References Cited

U.S. PATENT DOCUMENTS

| | | | | |
|---|---|---|---|---|
| 1,885,218 A * | 11/1932 | Phoebus | ................... | 137/588 |
| 1,972,962 A * | 9/1934 | Weber | ................... | 137/453 |
| 2,059,417 A * | 11/1936 | Thomas | ................... | 137/453 |
| 2,225,498 A * | 12/1940 | Hollander | ................... | 137/563 |
| 2,325,573 A * | 7/1943 | Thompson et al. | ................... | 137/563 |
| 2,351,580 A * | 6/1944 | Beckman | ................... | 137/453 |
| 2,384,912 A * | 9/1945 | Helin | ................... | 137/563 |
| 2,743,909 A * | 5/1956 | Lawlor | ................... | 137/563 |
| 3,054,418 A * | 9/1962 | Fromer | ................... | 137/147 |
| 3,129,717 A * | 4/1964 | Main et al. | ................... | 137/563 |
| 3,238,065 A * | 3/1966 | Fullhart, Jr. | ................... | 137/453 |
| 3,495,612 A * | 2/1970 | Learn et al. | ................... | 137/563 |
| 3,598,143 A * | 8/1971 | Mott | ................... | 137/389 |
| 3,851,662 A * | 12/1974 | Jessop | ................... | 137/563 |
| 3,941,147 A * | 3/1976 | Kaup et al. | ................... | 137/453 |
| 4,619,072 A * | 10/1986 | Privett | ................... | 137/453 |
| 4,650,339 A * | 3/1987 | Chetcuti et al. | ................... | 137/563 |
| 4,653,532 A * | 3/1987 | Powers | ................... | 137/563 |
| 5,057,858 A * | 10/1991 | Woog | ................... | 137/563 |
| 5,203,367 A * | 4/1993 | Akai et al. | ................... | 137/563 |
| 6,837,263 B2 * | 1/2005 | Kramer | ................... | 137/393 |

* cited by examiner

*Primary Examiner* — John Rivell
*Assistant Examiner* — Craig Price
(74) *Attorney, Agent, or Firm* — The Weintraub Group, P.L.C.

(57) ABSTRACT

Device for the regulation of the concentration of a product in a liquid and, most specifically, of an alcohol used in the composition of a varnish contained in a varnishing vat for optical glasses or other substrates. The vat comprises an overflow tray and a sealed alcohol reservoir. The reservoir is installed higher than the overflow tray so that when level of the varnish in the overflow tray drops sufficiently low, an air bubble is created that rises to the alcohol reservoir, thus creating additional pressure in the alcohol reservoir and forcing a drop of alcohol into the overflow tray until the level of the varnish in the overflow tray recovers its normal level above the junction point between the second pipe and the overflow tray.

20 Claims, 3 Drawing Sheets

DEVICE FOR REGULATION OF A CONCENTRATION FOR A PRODUCT IN A LIQUID

Figure 1:
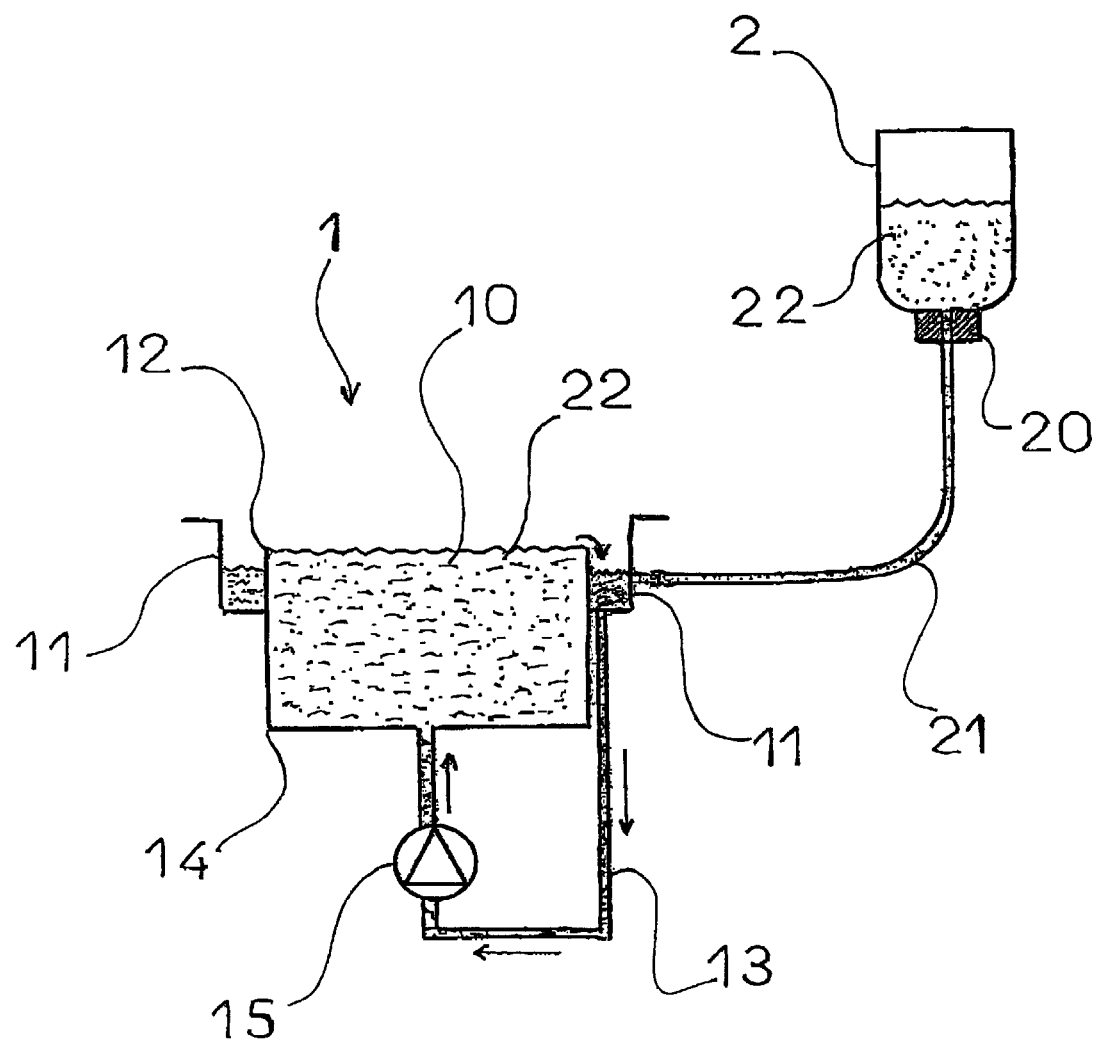
Figure 2:
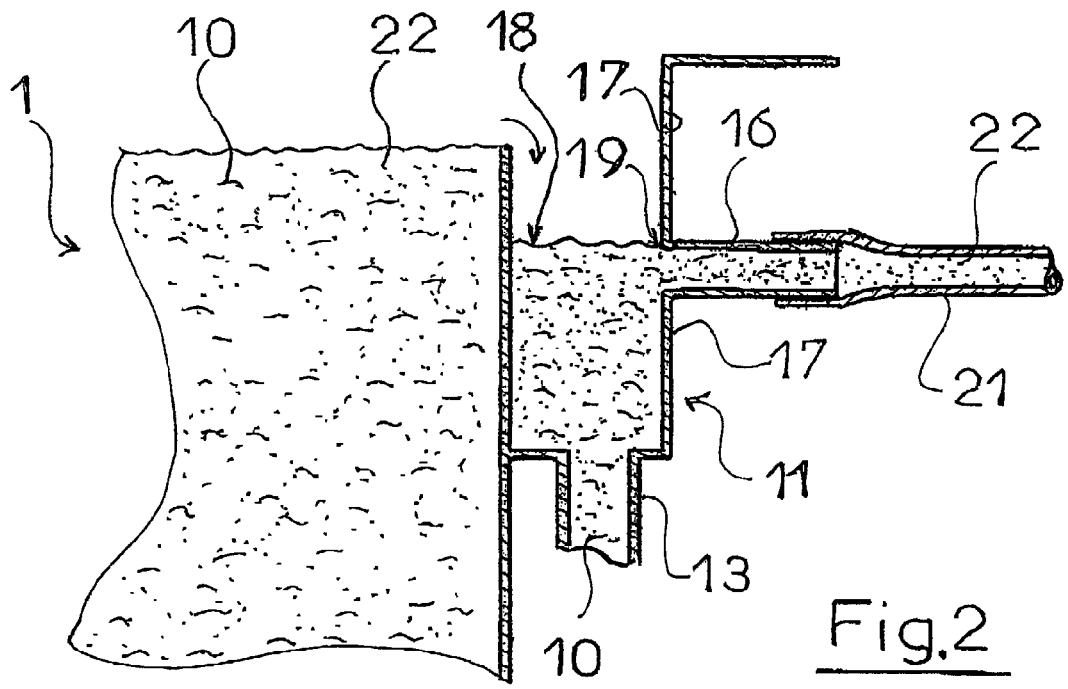
Figure 3:
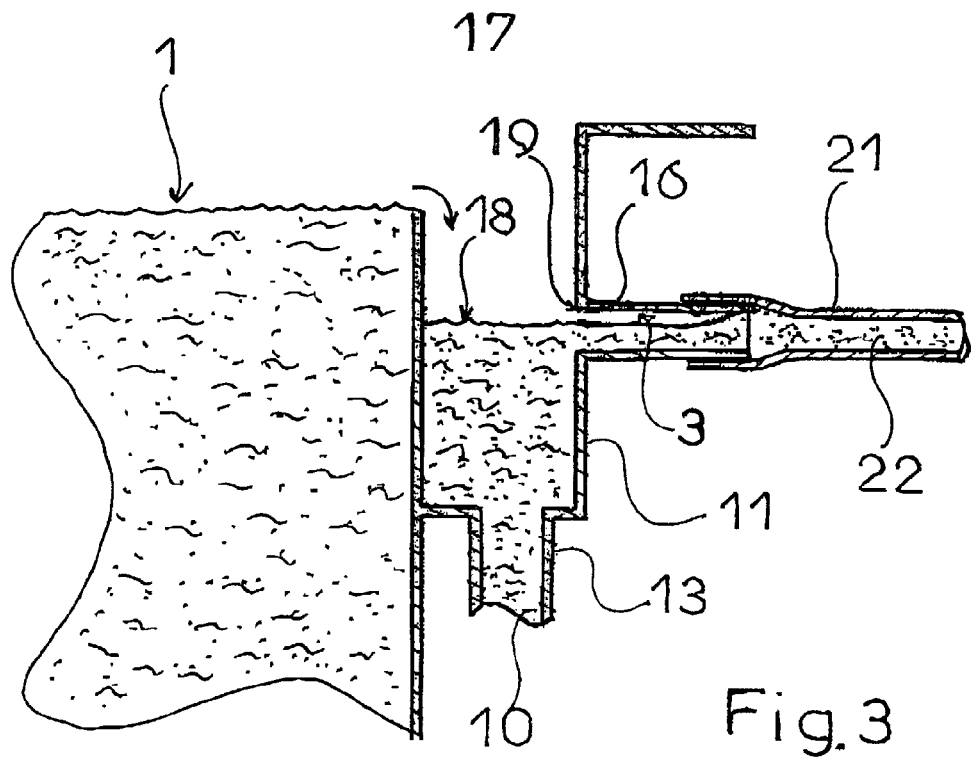
Figure 4:
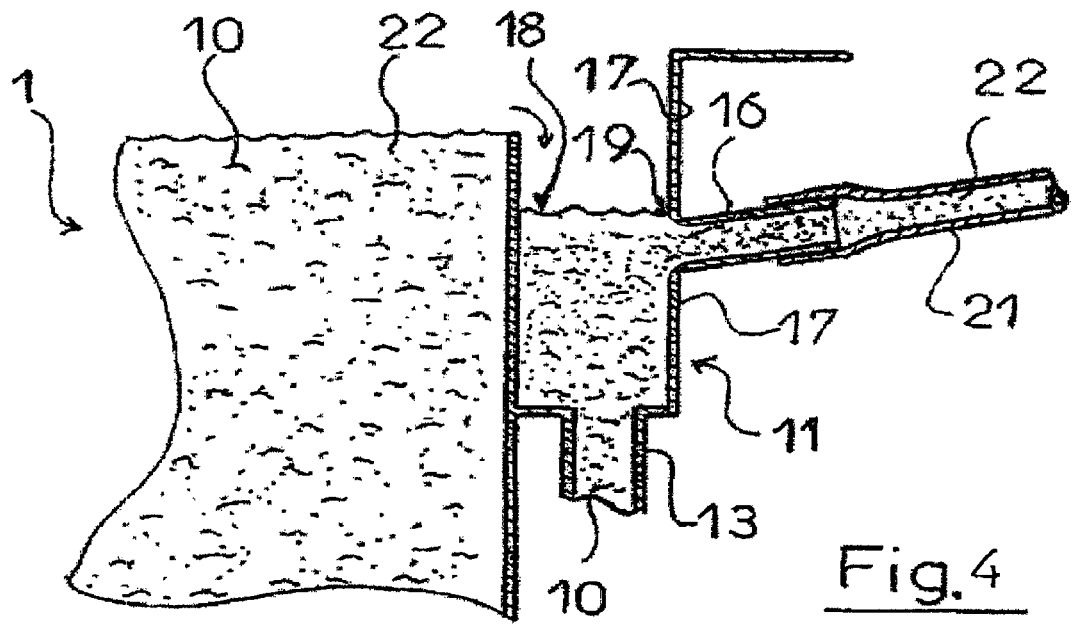
Figure 5:
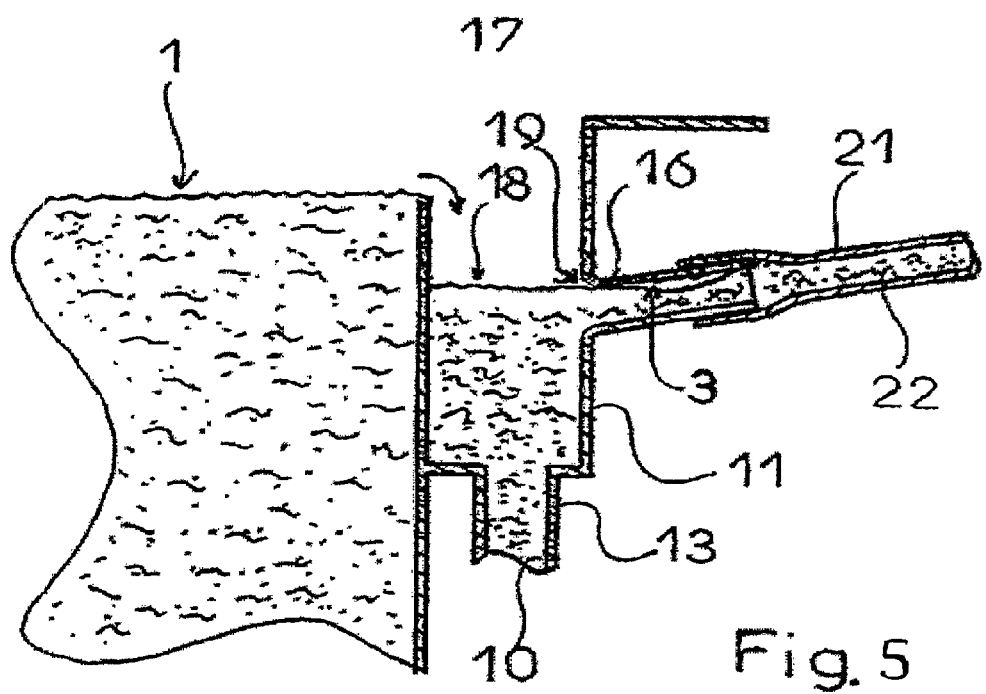

This invention covers a device that regulates the concentration of a product present in a liquid and more specifically the concentration of the alcohol used in the preparation of a varnish contained in a varnishing vat for optical glasses and other substrates.

In such vats containing varnish for optical glasses and other substrates, the varnish is in contact with the ambient air and the alcohol it contains evaporates. As a result, regular additions of alcohol are required to ensure the proper alcohol concentration in the varnish. Up until now, the alcohol had to be poured manually, an operation that had to be executed regularly and that the operator frequently forgot. Besides, this operation affects negatively the health of the operator. Also, this operation frequently got botched up because wrong doses of alcohol got added affecting the quality of the varnishing of optical glasses. The dose of alcohol to be added can also be controlled by an electronic system using high/low level sensors. However, such a system greatly increases the price of the varnishing vat.

Our invention solves these problems by proposing a device that controls the concentration of the alcohol in the vat of varnish for optical glasses and other substrates, and eliminates the needs for visual control and manual additions of alcohol while keeping production costs low.

As per this invention, the controlling device of the alcohol concentration in a varnishing vat comprises an overflow tray fixed to the vat external side and connected, on one side, to this varnishing vat via a first pipe and a continuously operating pump, and, on the other side, via a second pipe to a sealed alcohol tank installed higher than the overflowing tray, so that, when the varnish level drops below the level of the junction between the second pipe and the overflow tray because of alcohol evaporation, an air bubble is created that rises to the alcohol tank via the second tube. This creates additional pressure in the alcohol tank and frees a drop of alcohol in the overflow tray. This action continues until the level of the varnish in the overflow tray recovers its normal level above the junction point between the overflow tray and the second pipe, thus maintaining the desired alcohol concentration in the varnish.

As per this invention, the second pipe linking the overflow tray to the alcohol tank, will be flexible and should be connected to the overflow tray via a rigid pipe that runs more or less parallel to the horizontal surface of the varnish contained in the spout. Ideally, this rigid pipe will be inclined slightly upwards to allow the air bubbles to travel easily upwards from the opening of the pipe to the alcohol tank.

Characteristics and advantages of this invention will be better understood with the following description of the attached drawing that represents, without limitations, a method of assembly.

Drawing 1 is a simplified view of a cross-section of the device regulating the concentration of the alcohol in the varnishing vat as per this invention.

Drawing 2 is a detailed view of a cross-section of the overflow tray and its connection to the alcohol feeding pipe when the level of the varnish in the overflow tray is high.

Drawing 3 is a detailed view of the overflow tray and its connection to the alcohol feeding pipe when the level of the varnish in the overflow tray is low, caused by the evaporation of the alcohol contained in the varnish.

Drawing 4 is a detailed view of a cross-section of the overflow tray and its connection to an alternative embodiment of the alcohol feeding pipe when the level of the varnish in the overflow tray is high.

Drawing 5 is a detailed view of the overflow tray and its connection to an alternative embodiment of the alcohol feeding pipe when the level of the varnish in the overflow tray is low, caused by the evaporation of the alcohol contained in the varnish.

If we refer to drawing 1, we can see a vat (1) filled with a varnish (10) for optical glasses and other substances not shown, an overflow tray (11) with a U cross-section fixed to the vat external side (1) below its top edge (12), a pipe (13) that links the bottom of the tray (11) to the bottom (14) of the vat (1) through a pump (15) and an alcohol bottle (2) inverted and mounted higher than the tray (11) to which it is connected from its opening (20) by a flexible pipe (21).

Vat (1) communicates by overflow with tray (11) and pump (15) operates continuously to maintain a high level (10) of varnish in vat (1) and in tray (11). Any drop in the level of the varnish in vat (1) and particularly in tray (11) is due essentially to the evaporation of the alcohol (22) of the varnish (10), triggering an important variation that no longer guarantees good results in the varnishing of glasses or other substrates.

Referring to drawing 2, we can see that tray (11) has a rigid pipe (16) made as the tray (11) of stainless metal that extends parallel with the surface (10) of the varnish contained in the tray (11) and perpendicularly to the vertical external side (17) of the tray (11). The connection between the flexible pipe (21) feeding the alcohol and the rigid pipe (16) is achieved by connecting the free extremity of the flexible pipe (21) to the free extremity of the metallic pipe (16).

As seen in drawing 3, a drop of the level (18) of the varnish (10) in the overflow tray (11), caused by the evaporation of the alcohol in the varnish (10), below the junction point (19) of the pipe (16) and the vertical side (17) of the tray (11) results in the formation of an air bubble (3) in the metallic pipe (16) which goes up the flexible pipe (21) into the sealed alcohol bottle (2) and creates additional pressure in its inner air volume, thus releasing a drop of alcohol that will fall into the varnish (10) in tray (11). This process will repeat itself until the level (18) of the varnish (10) in tray (11) reaches its normal level above the junction (19) between the pipe (16) and the tray (11) as seen in drawing 2.

The concentration of the alcohol in the varnish (10) is thus automatically and naturally controlled by the addition of alcohol coming from bottle (2) when the level of the varnish (10) in tray (11) drops below the level of the junction (19) between the pipe (16) and the tray side (17), all without any manual intervention.

The metallic tube (16) of the overflow tray will preferably have a diameter of 6-8 mm and be beveled at its junction with the tray's inner side for an easier penetration of the air bubble. Moreover, as shown in drawings 4 and 5, the metallic tube (16) can be slightly inclined upward to allow a better ascend up the air bubble through the flexible pipe (21) leading to the alcohol bottle.

It should be noted that our regulating device covered by this invention could also be used for other liquids such as detergents (water+soap) without being outside the framework of this invention and still work as explained.

The invention claimed is:
1. A device for regulating the concentration of an alcohol (22) in a varnish (10) composition contained in a varnishing vat (1) comprising:
an overflow tray (11) fixed to an outer side of the vat (1);

a first pipe (13) connected to both the vat (1) and the overflow tray (11) for establishing fluid communication therebetween, the first pipe (13) including a continuously operating pump for circulating the composition of alcohol (22) and varnish (10) from the overflow tray (11) to the vat (1); and a second pipe (21) having first and second ends, the first end being connected to a wall of the overflow tray (11) and the second end being connected to a sealed alcohol reservoir (2), the second end of the second pipe being placed higher than the overflow tray (11), the first end of the second pipe (21) and the wall of the overflow tray (11) defining a junction point (19), the junction point (19) being positioned below a top edge of the vat (1);

wherein the alcohol/varnish composition, being circulated by the pump, continuously flows over the top edge of the vat (1) and into the overflow tray (11), and when a volume of the alcohols evaporates from the alcohol/varnish composition, a level of the alcohol/varnish composition in the overflow tray (11) is lowered until at least one air bubble can enter into the first end of the second pipe, rise up into the sealed alcohol reservoir (2), and release a volume of alcohol into the overflow tray (11), thereby regulating the concentration of the alcohol in the varnish composition.

2. The device of claim 1 wherein the second pipe is a flexible pipe connected to a rigid metallic tube extending outwardly from the overflow tray in a direction that is substantially parallel with a surface of the alcohol/varnish composition.

3. The device of claim 2 wherein the overflow tray (11) and the tube are formed from stainless metal.

4. The device of claim 2 wherein the tube has an internal diameter of 6-8 mm.

5. The device of claim 2 wherein the junction point is beveled to provide a smoother entry of the air bubbles into the second pipe.

6. The device of claim 2 wherein the sealed alcohol reservoir (2) comprises an inverted bottle having a single opening connected to the second end of the second pipe.

7. The device of claim 2 wherein the overflow tray (11) has a U-shaped cross-section.

8. The device of claim 3 wherein the sealed alcohol reservoir (2) comprises an inverted bottle having a single opening connected to the second end of the second pipe.

9. The device of claim 3 wherein the overflow tray (11) has a U-shaped cross-section.

10. The device of claim 5 wherein the sealed alcohol reservoir (2) comprises an inverted bottle having a single opening connected to the second end of the second pipe.

11. The device of claim 5 wherein the overflow tray (11) has a U-shaped cross-section.

12. The device of claim 1 wherein the second pipe is a flexible pipe connected to a rigid metallic tube extending outwardly from the overflow tray and inclined upwardly, thereby allowing a more efficient rise of the air bubble through the second pipe and into the sealed alcohol reservoir.

13. The device of claim 12 wherein the overflow tray (11) and the tube are formed from stainless metal.

14. The device of claim 12 wherein the tube has an internal diameter of 6-8 mm.

15. The device of claim 12 wherein the junction point is beveled to provide a smoother entry of the air bubbles into the second pipe.

16. The device of claim 12 wherein the sealed alcohol reservoir (2) comprises an inverted bottle having a single opening connected to the second end of the second pipe.

17. The device of claim 12 wherein the overflow tray (11) has a U-shaped cross-section.

18. The device of claim 13 wherein the sealed alcohol reservoir (2) comprises an inverted bottle having a single opening connected to the second end of the second pipe.

19. The device of claim 15 wherein the sealed alcohol reservoir (2) comprises an inverted bottle having a single opening connected to the second end of the second pipe.

20. The device of claim 15 wherein the overflow tray (11) has a U-shaped cross-section.

* * * * *